US012743547B2

(12) United States Patent
Yu et al.

(10) Patent No.: US 12,743,547 B2
(45) Date of Patent: Sep. 22, 2026

(54) METHOD, DEVICE, EQUIPMENT AND MEDIUM FOR FALSE-REPORT ELIMINATION

(71) Applicant: Hangzhou Meari Technology Co., Ltd., Hangzhou (CN)

(72) Inventors: Shiquan Yu, Hangzhou (CN); Gangqiang Zhao, Hangzhou (CN); Haijun Gu, Hangzhou (CN); Wei Jin, Hangzhou (CN); Hongli Ying, Hangzhou (CN)

(73) Assignee: Hangzhou Meari Technology Co., Ltd., Hangzhou (CN)

( * ) Notice: Subject to any disclaimer, the term of this patent is extended or adjusted under 35 U.S.C. 154(b) by 50 days.

(21) Appl. No.: 18/619,206

(22) Filed: Mar. 28, 2024

(65) Prior Publication Data

US 2024/0330507 A1 Oct. 3, 2024

(30) Foreign Application Priority Data

Mar. 28, 2023 (CN) ........................ 202310308239.4

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *G06V 10/40* (2022.01);
(Continued)

(58) Field of Classification Search
CPC ... G06F 21/6245; G06F 21/602; G06V 20/52; G06V 10/762; G06V 10/40; G06V 10/82; G06V 10/94; G06V 10/751
(Continued)

(56) References Cited

U.S. PATENT DOCUMENTS 11,682,194 B2 * 6/2023 Guo ........................ G06V 10/95 382/157
2019/0130214 A1 * 5/2019 N ........................ G06F 18/2414
(Continued)

FOREIGN PATENT DOCUMENTS

CN 108062349 A 5/2018
CN 108961312 A * 12/2018 ............ G06T 7/262
(Continued)

OTHER PUBLICATIONS

Privacy-Preserving Surveillance as an Edge Service Based on Lightweight Video Protection Schemes Using Face De-Identification and Window Masking Alem Fitwi et al. pp. 1-36, Publication date: Jan. 2021 (Year: 2021).*
(Continued)

*Primary Examiner* — Tauqir Hussain
(74) *Attorney, Agent, or Firm* — Westbridge IP LLC

(57) ABSTRACT

A false positive elimination method includes: analyzing a target object to obtain an encryption feature and current position information of the target object; acquiring current image information of the target object, and comparing local historical image information with the current image information to obtain a comparison result; detecting the current image information according to the current position information when the historical image information is inconsistent with the current image information, and sending the encryption feature to a cloud when the target object is detectable in the current image information, so that the cloud determines actual position information of the target object based on the encryption feature; and acquiring the actual position information, verifying the target object based on the actual position information, determining the target object as a false positive object in response to the passed verification, and
(Continued)

performing a false positive elimination operation on the false positive object.

18 Claims, 11 Drawing Sheets

(51) Int. Cl.

| | |
|---|---|
| ***G06V 10/40*** | (2022.01) |
| ***G06V 10/75*** | (2022.01) |
| ***G06V 10/762*** | (2022.01) |
| ***G06V 10/82*** | (2022.01) |
| ***G06V 10/94*** | (2022.01) |
| ***G06V 20/52*** | (2022.01) |

(52) U.S. Cl.
CPC .......... *G06V 10/751* (2022.01); *G06V 10/762* (2022.01); *G06V 10/82* (2022.01); *G06V 10/94* (2022.01); *G06V 20/52* (2022.01)

(58) Field of Classification Search
USPC .......... 726/27
See application file for complete search history.

(56) References Cited

U.S. PATENT DOCUMENTS

| | | | | |
|---|---|---|---|---|
| 2019/0304105 | A1* | 10/2019 | Gao | G06V 10/255 |
| 2022/0114739 | A1* | 4/2022 | Gao | G06T 7/262 |
| 2022/0383477 | A1* | 12/2022 | Umeda | G06V 10/40 |
| 2023/0186456 | A1* | 6/2023 | Marciano | G06V 10/82<br>382/141 |
| 2023/0237810 | A1* | 7/2023 | Roedler | G06V 10/82<br>382/103 |
| 2023/0386213 | A1* | 11/2023 | Park | G06V 20/52 |

FOREIGN PATENT DOCUMENTS

| | | | | | |
|---|---|---|---|---|---|
| CN | 109164443 | A | | 1/2019 | |
| CN | 109658437 | A | | 4/2019 | |
| CN | 113239935 | A | * | 8/2021 | G06V 10/462 |
| CN | 113689321 | A | * | 11/2021 | G06F 21/602 |
| CN | 113869110 | A | | 12/2021 | |
| CN | 114926667 | A | | 8/2022 | |
| CN | 115103157 | A | | 9/2022 | |
| CN | 115454116 | A | | 12/2022 | |
| JP | 2022026109 | A | | 2/2022 | |
| WO | 2022166047 | A1 | | 8/2022 | |
| WO | WO-2023009511 | A1 | * | 2/2023 | G06V 30/40 |

OTHER PUBLICATIONS

Guo Huiwen, et al., 3D Background estimation for moving object detection using a single moving camera, Chinese Journal of Scientific Instrument, 2017, pp. 2573-2580, vol. 38 No. 10.

* cited by examiner

Figure 1:
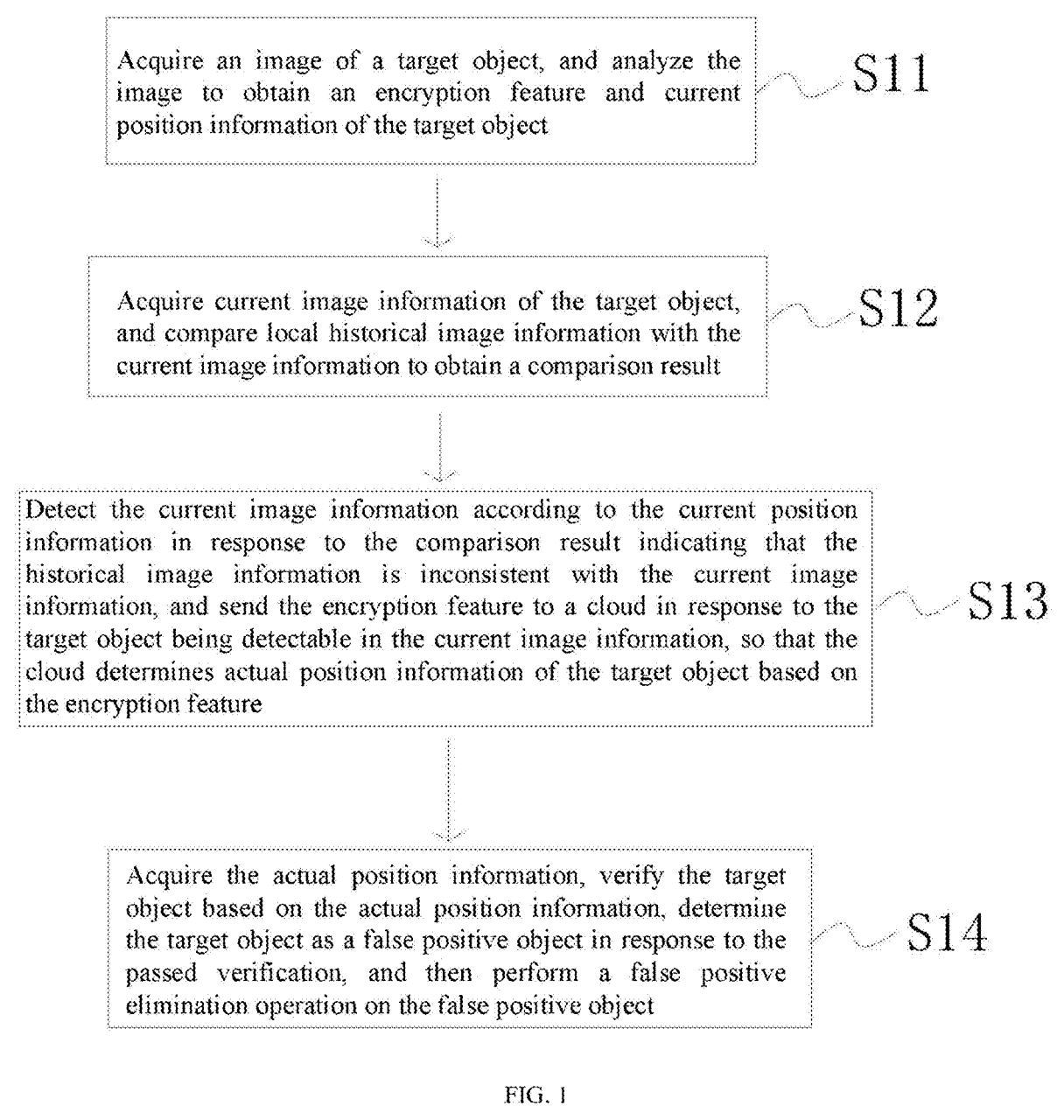

Acquire an image of a target object, and analyze the image to obtain an encryption feature and current position information of the target object — S11

Acquire current image information of the target object, and compare local historical image information with the current image information to obtain a comparison result — S12

Detect the current image information according to the current position information in response to the comparison result indicating that the historical image information is inconsistent with the current image information, and send the encryption feature to a cloud in response to the target object being detectable in the current image information, so that the cloud determines actual position information of the target object based on the encryption feature — S13

Acquire the actual position information, verify the target object based on the actual position information, determine the target object as a false positive object in response to the passed verification, and then perform a false positive elimination operation on the false positive object — S14

METHOD, DEVICE, EQUIPMENT AND MEDIUM FOR FALSE-REPORT ELIMINATION

CROSS REFERENCE TO THE RELATED APPLICATIONS

This application is based upon and claims priority to Chinese Patent Application No. 202310308239.4, filed on Mar. 28, 2023, the entire contents of which are incorporated herein by reference.

TECHNICAL FIELD

The disclosure relates to the field of civil security monitoring, in particular to a false positive elimination method and apparatus, a device, and a medium.

BACKGROUND

In nowadays society, intelligent home appliances have entered thousands of households, people's demand for intelligent household items has generally increased, and intelligent security cameras have become indispensable household security devices in the civilian market. The intelligent function of current security cameras mainly refers to computing using a cloud server (hereinafter referred to as a cloud) on the cloud or computing using an edge computing chip on a device. Cloud computing can obtain a better intelligent experience, but a single cloud computing architecture will lead to a sudden increase in server pressure during peak periods, thus increasing the computing cost of the device. Users of such products generally need to pay a higher monthly subscription fee for a cloud service. At the same time, for cloud computing, pictures or videos need to be uploaded to the cloud server for analysis, which means that family privacy images need to be authorized for the cloud service, facing the security issue of privacy leakage. Edge computing on the device can reduce computing costs. At the same time, all computations run locally on the device without uploading any pictures, which has a better protection effect on privacy. However, due to the computing power constraints and cost requirements of the chip, an edge computing device provides an unsatisfactory intelligent experience compared with a cloud computing device, and users often receive relevant error messages of false positive from devices, thus affecting the product experience.

Therefore, how to reduce the costs of the device and the cloud service, increase the stability of the device and the cloud service, and improve the user experience effect is a problem to be solved in the art.

SUMMARY

In view of this, an object of the disclosure is to provide a false positive elimination method and apparatus, a device, and a medium, which can reduce the costs of a device and a cloud service, increase the stability of the device and the cloud service, and improve the user experience effect. A specific scheme is adopted as follows.

In a first aspect, the disclosure discloses a false positive elimination method, which is applied to a device and includes:

- acquiring an image of a target object, and analyzing the image to obtain an encryption feature and current position information of the target object;

- acquiring current image information of the target object, and comparing local historical image information with the current image information to obtain a comparison result;
- detecting the current image information according to the current position information in response to the comparison result indicating that the historical image information is inconsistent with the current image information, and sending the encryption feature to a cloud in response to the target object being detectable in the current image information, so that the cloud determines actual position information of the target object based on the encryption feature; and
- acquiring the actual position information, verifying the target object based on the actual position information, determining the target object as a false positive object in response to the passed verification, and then performing a false positive elimination operation on the false positive object.

Optionally, before the acquiring an image of a target object, the method further includes: acquiring a pre-trained device model; and

- deploying the device model to an initial device to obtain the device.

Optionally, the acquiring an image of a target object and analyzing the image to obtain an encryption feature and current position information of the target object includes:

- acquiring the image of the target object by using a local device object detection unit; and
- sending the image to the local device model to obtain the encryption feature and the current position information of the target object.

Optionally, the comparing local historical image information with the current image information includes:

- sending current background image information to a local short-term background memory unit, so that the short-term background memory unit compares the local historical image information with the current image information by using a regression algorithm.

Optionally, the verifying the target object based on the actual position information and determining the target object as a false positive object in response to the passed verification includes:

- verifying the target object based on the actual position information by using a local device and cloud joint verification unit, determining the target object as a false positive object in response to the passed verification, and generating false positive information; and
- recording and storing the false positive information to a local false positive memory unit.

Optionally, the verifying the target object based on the actual position information and determining the target object as a false positive object in response to the passed verification includes:

- determining a false positive object feature based on the actual position information by using a deep neural network object self-learning algorithm, and determining a target object feature based on the current position information by using the deep neural network object self-learning algorithm; and
- judging whether the false positive object feature is consistent with the target object feature, passing the verification in response to the false positive object feature being consistent with the target object feature, and determining the target object as the false positive object.

Optionally, after the judging whether the false positive object feature is consistent with the target object feature, the method further includes:

determining a matching difference value in response to the false positive object feature being inconsistent with the target object feature; and judging whether the matching difference value is less than a preset threshold, redetermining a false positive object feature in response to the matching difference value being less than the preset threshold, and then rejudging whether the false positive object feature is consistent with the target object feature.

In a second aspect, the disclosure discloses a false positive elimination apparatus, including:

an encryption feature determination module, configured to acquire an image of a target object, and analyze the image to obtain an encryption feature and current position information of the target object;

a current image information acquisition module, configured to acquire current image information of the target object, and compare local historical image information with the current image information to obtain a comparison result;

an encryption feature sending module, configured to detect the current image information according to the current position information in response to the comparison result indicating that the historical image information is inconsistent with the current image information, and send the encryption feature to a cloud in response to the target object being detectable in the current image information, so that the cloud determines actual position information of the target object based on the encryption feature; and a false positive elimination module, configured to acquire the actual position information, verify the target object based on the actual position information, determine the target object as a false positive object in response to the passed verification, and then perform a false positive elimination operation on the false positive object.

In a third aspect, the disclosure discloses an electronic device, including:

a memory, configured to store a computer program; and a processor, configured to execute the computer program to implement the foregoing false positive elimination method.

In a fourth aspect, the disclosure discloses a computer-readable storage medium, configured to store a computer program. The computer program, when executed by a processor, implements the steps of the false positive elimination method disclosed above.

Therefore, the disclosure provides a false positive elimination method, including: acquiring an image of a target object, and analyzing the image to obtain an encryption feature and current position information of the target object; acquiring current image information of the target object, and comparing local historical image information with the current image information to obtain a comparison result; detecting the current image information according to the current position information in response to the comparison result indicating that the historical image information is inconsistent with the current image information, and sending the encryption feature to a cloud in response to the target object being detectable in the current image information, so that the cloud determines actual position information of the target object based on the encryption feature; and acquiring the actual position information, verifying the target object based on the actual position information, determining the target object as a false positive object in response to the passed verification, and then performing a false positive elimination operation on the false positive object. In the disclosure, an optimal network structure suitable for a cloud and a device is obtained by searching through a split network in conjunction with a deep learning network architecture, thereby reducing the computing volume of the device and the cloud. The learning ability of the network is catalyzed by using a knowledge distillation technology, thereby improving the accuracy of device and cloud algorithms. Features extracted by using the device algorithm are uploaded to the cloud for secondary computation and verification, and results are fed back to the device. The device records the relevant content of false positives and false negatives by using a false positive memory unit, thereby increasing the accuracy of the device algorithm and reducing subsequent false positives and false negatives to obtain a better intelligent experience. The disclosure has low requirements on the computing power of the device and has strong universality. A short-term background memory unit is designed, which allows joint verification between the device and the cloud when there is a major scene change, thereby effectively reducing the number of server peak requests. In addition, the cloud only deploys a split network header model, thereby improving the detection speed and improving the intelligent experience effect of the device. At the same time, only encrypted image features are uploaded, thereby effectively protecting user privacy. The running speed and accuracy can meet actual scene applications, and the promotion value is greater.

BRIEF DESCRIPTION OF THE DRAWINGS

To explain the technical solutions in the embodiments of the disclosure or in the related art more clearly, a brief description will be given below with reference to the drawings to be used in the description of the embodiments or the related art. It is apparent that the drawings in the description below are merely some embodiments of the disclosure. Those of ordinary skill in the art may also obtain other drawings according to these drawings without involving any inventive effort.

FIG. 1 is a flowchart of a false positive elimination method according to the disclosure;

FIG. 5 is a flowchart of a false positive elimination method according to the disclosure;

DETAILED DESCRIPTION OF THE EMBODIMENTS

Figure 2:
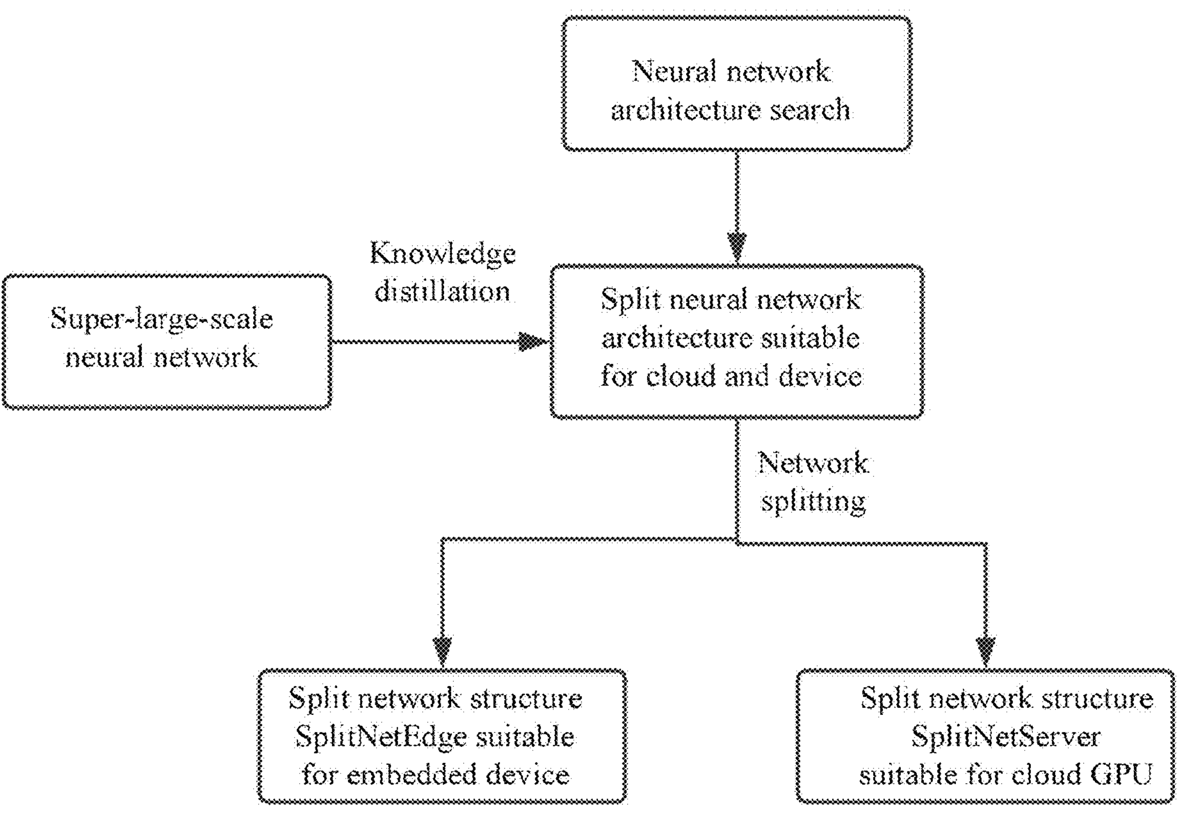
FIG. 2 is a deployment flowchart of device and cloud models according to the disclosure.

The following clearly and completely describes the technical solutions in the embodiments of the disclosure with reference to the drawings in the embodiments of the disclosure. It is apparent that the described embodiments are some of the embodiments of the disclosure rather than all of the embodiments. Based on the embodiments of the disclosure, all other embodiments obtained by those of ordinary skill in the art without involving any inventive effort fall within the scope of protection of the disclosure.

In nowadays society, intelligent home appliances have entered thousands of households, people's demand for intelligent household items has generally increased, and intelligent security cameras have become indispensable household security devices in the civilian market. The intelligent function of current security cameras mainly refers to computing using a cloud server (hereinafter referred to as a cloud) on the cloud or computing using an edge computing chip on a device. Cloud computing can obtain a better intelligent experience, but a single cloud computing architecture will lead to a sudden increase in server pressure during peak periods, thus increasing the computing cost of the device. Users of such products generally need to pay a higher monthly subscription fee for a cloud service. At the same time, for cloud computing, pictures or videos need to be uploaded to the cloud server for analysis, which means that family privacy images need to be authorized for the cloud service, facing the security issue of privacy leakage. Edge computing on the device can reduce computing costs. At the same time, all computations run locally on the device without uploading any pictures, which has a better protection effect on privacy. However, due to the computing power constraints and cost requirements of the chip, an edge computing device provides an unsatisfactory intelligent experience compared with a cloud computing device, and users often receive relevant error messages of false positive from devices, thus affecting the product experience. Therefore, how to reduce the costs of the device and the cloud service, increase the stability of the device and the cloud service, and improve the user experience effect is a problem to be solved in the art.

Referring to FIG. 1, an embodiment of the disclosure discloses a false positive elimination method, which may specifically include:

Step S11: Acquire an image of a target object, and analyze the image to obtain an encryption feature and current position information of the target object.

In this embodiment, before the acquiring an image of a target object, the method further includes: acquiring a pre-trained device model; and deploying the device model to an initial device to obtain a device.

Specifically, the image of the target object is acquired by using a local device object detection unit. Then, the image is sent to the local device model to obtain the encryption feature and the current position information of the target object.

Specifically, the computing powers and acceleration principles of the device and the cloud are quite different. To ensure that each part of a split network can obtain the optimal acceleration efficiency on respective devices after splitting, a neural network architecture search technology (NAS) is required at this moment. A network architecture SplitNetEdge that is most suitable for the device and a network header architecture SplitNetServer that is most suitable for the cloud are searched out by using the NAS respectively, and are combined into a network model for training as a whole. Limited by the limited amount of data and a small number of device model parameters, it is easy to enter a local optimal solution by directly training the model. To train the model into a global optimal solution as much as possible, a knowledge distillation technology is used here to catalyze the learning ability of the network. As shown in FIG. 2, a super-large-scale network model is first trained as a teacher model by using data. Then, by using an output result of a super-large model obtained by training and using a mean square error (MSE) as a trained Loss (loss function of neural network), knowledge distillation training is performed to train an optimal student model, and the student model is split to obtain a model SplitNetEdge (namely, the device model) that is suitable for the device and a network header model SplitNetServer that is most suitable for the cloud.

$$\text{loss}(x, y) = \frac{\sum_{i=1}^{n} (y_i - f(x_i))^2}{n}$$

where x represents the output result of the neural network, and y is the real result.

In the disclosure, a large amount of training data needs to be acquired. By only recording a video in different scenes, hundredfold training data may be obtained through the video. The specific operation steps are as follows: (1) separating the video frame by frame; (2) intercepting one of regions in an image; (3) after box offset ($x_n$, $y_n$) in another frame, intercepting an image with regions of the same size as that in (2); (4) training with the images in (2) and (3) as inputs and the offset ($x_n$, $y_n$) in (3) as a truth value; and (5) randomly pasting a target object to be detected in the data during training to reduce resulting shocks of the model due to the invasion of the target object in the foreground.

Figure 3:
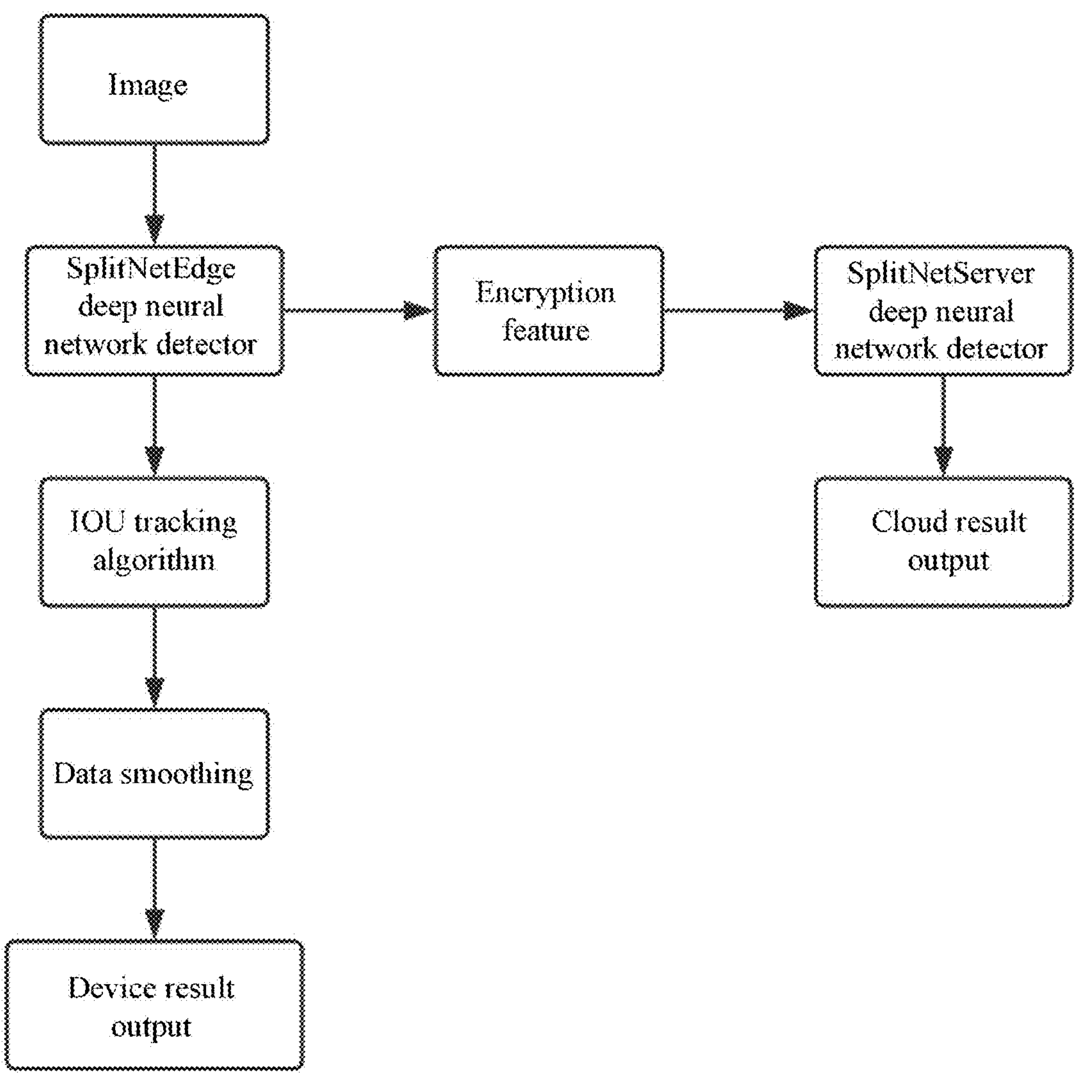
FIG. 3 is a reasoning flowchart of a device model according to the disclosure.

In this embodiment, the device and cloud object detection unit includes an object detection unit primarily adopting a deep neural network of a split network and secondarily adopting a traditional image algorithm and a filtering algorithm. After an image is acquired on the device, the specific process is shown in FIG. 3. First, the image is sent to a SplitNetEdge deep network detector for reasoning and analysis to acquire a preliminary result and an encryption feature. The result acquired at this moment is a reasoning result of a single-frame image. It is necessary to use a tracking algorithm to match the same object in different images to obtain position information of a target object in different time periods. Limited by the computing power and resources of the device, an efficient and fast intersection over union (IOU) object tracking algorithm is selected herein, and fast matching may be performed when fewer resources are consumed. The current result is matched and tracked with the previous frames of images through the IOU tracking algorithm to find positions of the same object in the images in different time periods. The device algorithm is small in size and fast in operation, but there are often occasional single-frame false positives, false negatives, and unstable jumps in the return of position information of the same target. At this moment, it is necessary to use the filtering algorithm to smooth the operation results to filter the single-frame false positives and false negatives, thus acquiring a relatively smooth object motion curve.

Step S12: Acquire current image information of the target object, and compare local historical image information with the current image information to obtain a comparison result.

In this embodiment, after the current image information of the target object is acquired, current background image information is sent to a local short-term background memory unit, so that the short-term background memory unit compares the local historical image information with the current image information by using a regression algorithm, so as to obtain a comparison result.

Figure 4:
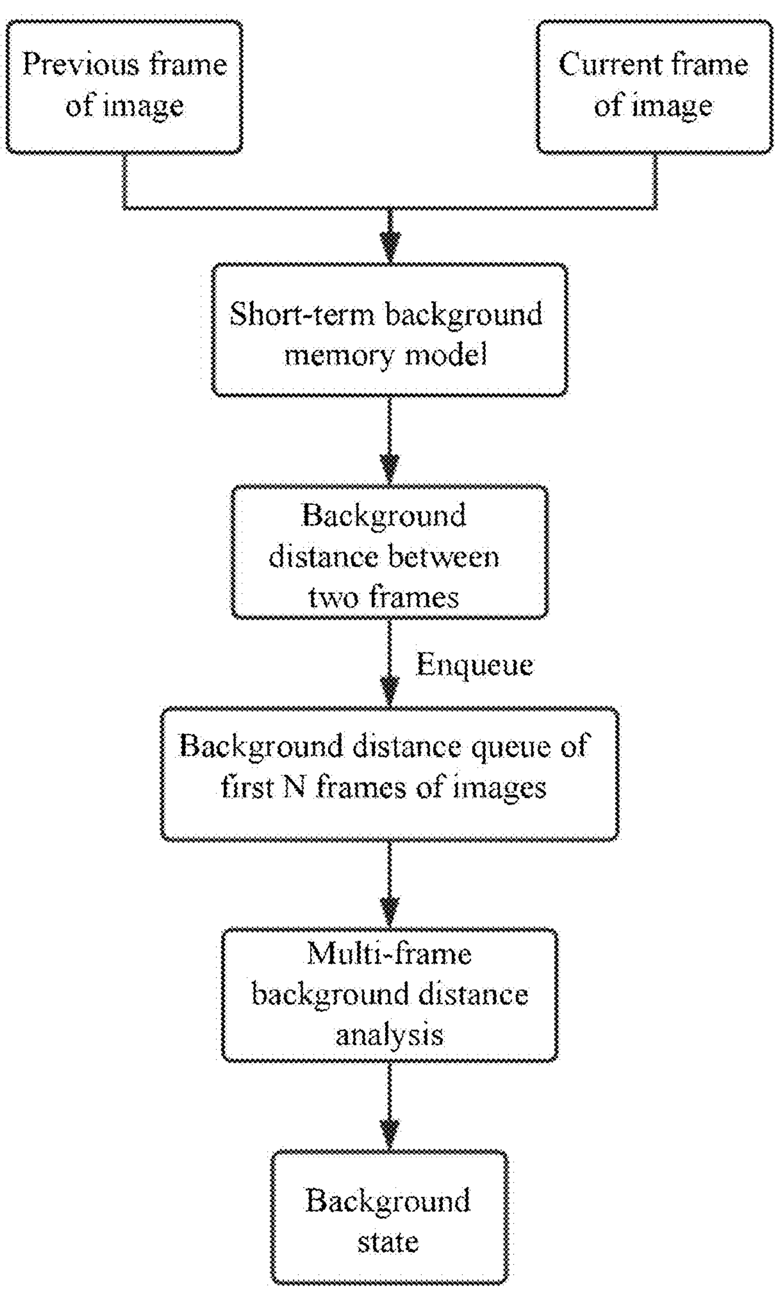
FIG. 4 is a flowchart of image information comparison according to the disclosure.

A household monitor is often placed in the same position in the same environment, and the background does not change often. Once a false positive object in the background are memorized through the false positive memory unit, there is no need to send frequent requests to the cloud to verify whether there is a false positive object in the current scene. Therefore, an algorithm that judges whether the current background has changed is required to perceive background changes. The household monitor includes a monitor installed at a fixed position and a monitor with a pan-tilt inspection function. For the monitor with the pan-tilt inspection function, a short-term background is changing rapidly, and in an actual scene, a target object often invades a foreground picture to interfere with the detection of background changes. Traditional background modeling methods are no longer enough to deal with the scene. The specific steps are shown in FIG. 4. A short-term background memory method is proposed herein, which may memorize the short-term background and judge whether the background has changed. At the same time, the method may filter objects to be detected and eliminate the impact of foreground changes on detection results. The short-term background memory unit uses a regression algorithm, compares a plurality of pictures in a short term, outputs a position offset of a current picture relative to the compared pictures, obtains a background distance between the current picture and all images in a short term, and performs weighted judgment to judge that the current picture is in a static, reciprocating or changing state in a short term. The method may be applied to a network camera in a fixed direction, may also be applied to a short-term reciprocating inspection camera, and has higher universality.

Step S13: Detect the current image information according to the current position information in response to the comparison result indicating that the historical image information is inconsistent with the current image information, and send the encryption feature to a cloud in response to the target object being detectable in the current image information, so that the cloud determines actual position information of the target object based on the encryption feature.

Step S14: Acquire the actual position information, verify the target object based on the actual position information, determine the target object as a false positive object in response to the passed verification, and then perform a false positive elimination operation on the false positive object.

In this embodiment, an image of a target object is acquired, and the image is analyzed to obtain an encryption feature and current position information of the target object. Current image information of the target object is acquired, and local historical image information is compared with the current image information to obtain a comparison result. The current image information is detected according to the current position information in response to the comparison result indicating that the historical image information is inconsistent with the current image information, and the encryption feature is sent to a cloud in response to the target object being detectable in the current image information, so that the cloud determines actual position information of the target object based on the encryption feature. The actual position information is acquired, the target object is verified based on the actual position information, the target object is determined as a false positive object in response to the passed verification, and then a false positive elimination operation is performed on the false positive object. In the disclosure, an optimal network structure suitable for a cloud and a device is obtained by searching through a split network in conjunction with a deep learning network architecture, thereby reducing the computing volume of the device and the cloud. The learning ability of the network is catalyzed by using a knowledge distillation technology, thereby improving the accuracy of device and cloud algorithms. Features extracted by using the device algorithm are uploaded to the cloud for secondary computation and verification, and results are fed back to the device. The device records the relevant content of false positives and false negatives by using a false positive memory unit, thereby increasing the accuracy of the device algorithm and reducing subsequent false positives and false negatives to obtain a better intelligent experience. The disclosure has low requirements on the computing power of the device and has strong universality. A short-term background memory unit is designed, which allows joint verification between the device and the cloud when there is a major scene change, thereby effectively reducing the number of server peak requests. In addition, the cloud only deploys a split network header model, thereby improving the detection speed and improving the intelligent experience effect of the device. At the same time, only encrypted image features are uploaded, thereby effectively protecting user privacy. The running speed and accuracy can meet actual scene applications, and the promotion value is greater.

Figure 5:
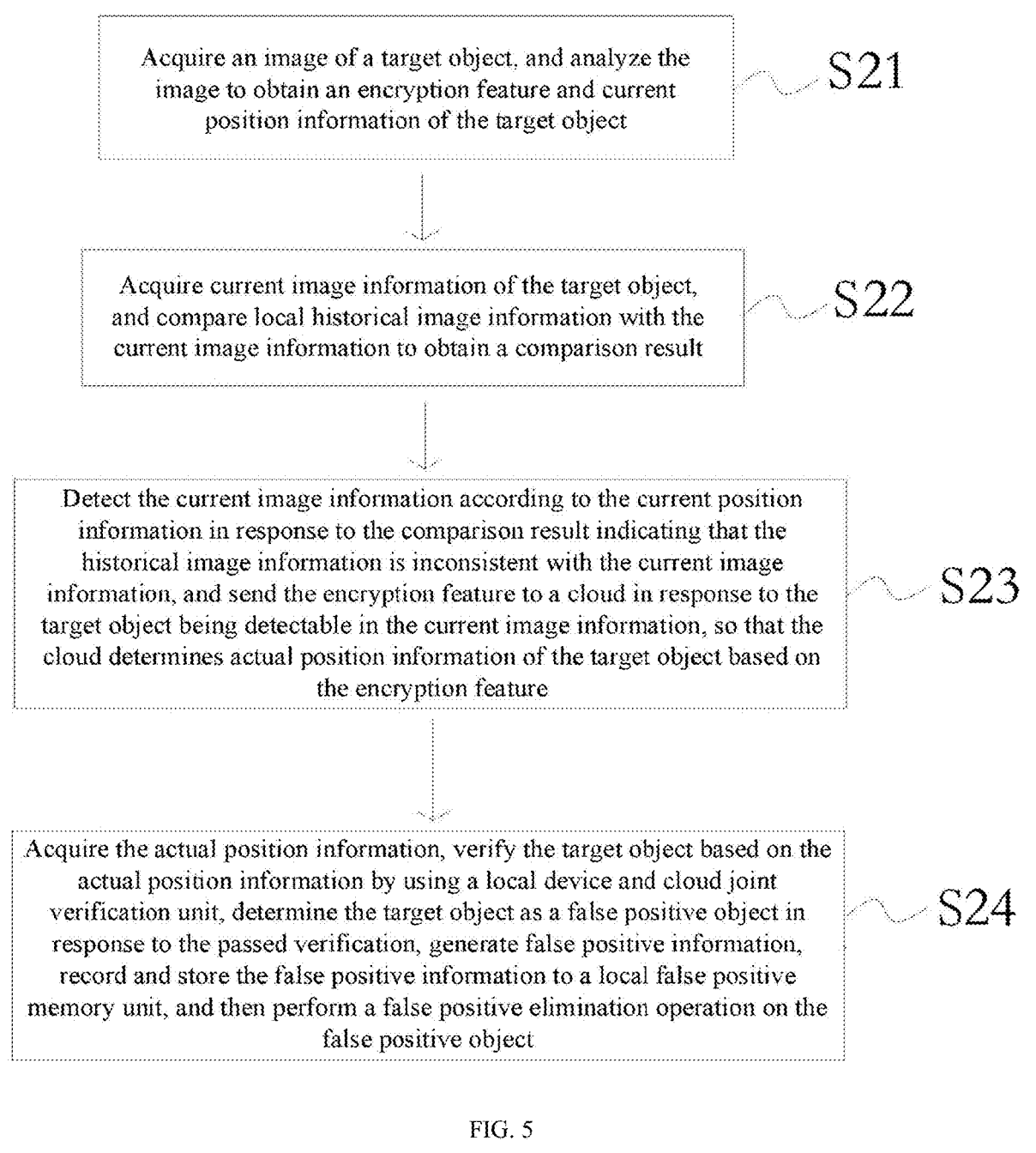

Referring to FIG. 5, an embodiment of the disclosure discloses a false positive elimination method, which may specifically include:

Step S21: Acquire an image of a target object, and analyze the image to obtain an encryption feature and current position information of the target object.

Step S22: Acquire current image information of the target object, and compare local historical image information with the current image information to obtain a comparison result.

Step S23: Detect the current image information according to the current position information in response to the comparison result indicating that the historical image information is inconsistent with the current image information, and send the encryption feature to a cloud in response to the target object being detectable in the current image information, so that the cloud determines actual position information of the target object based on the encryption feature.

Figure 6:
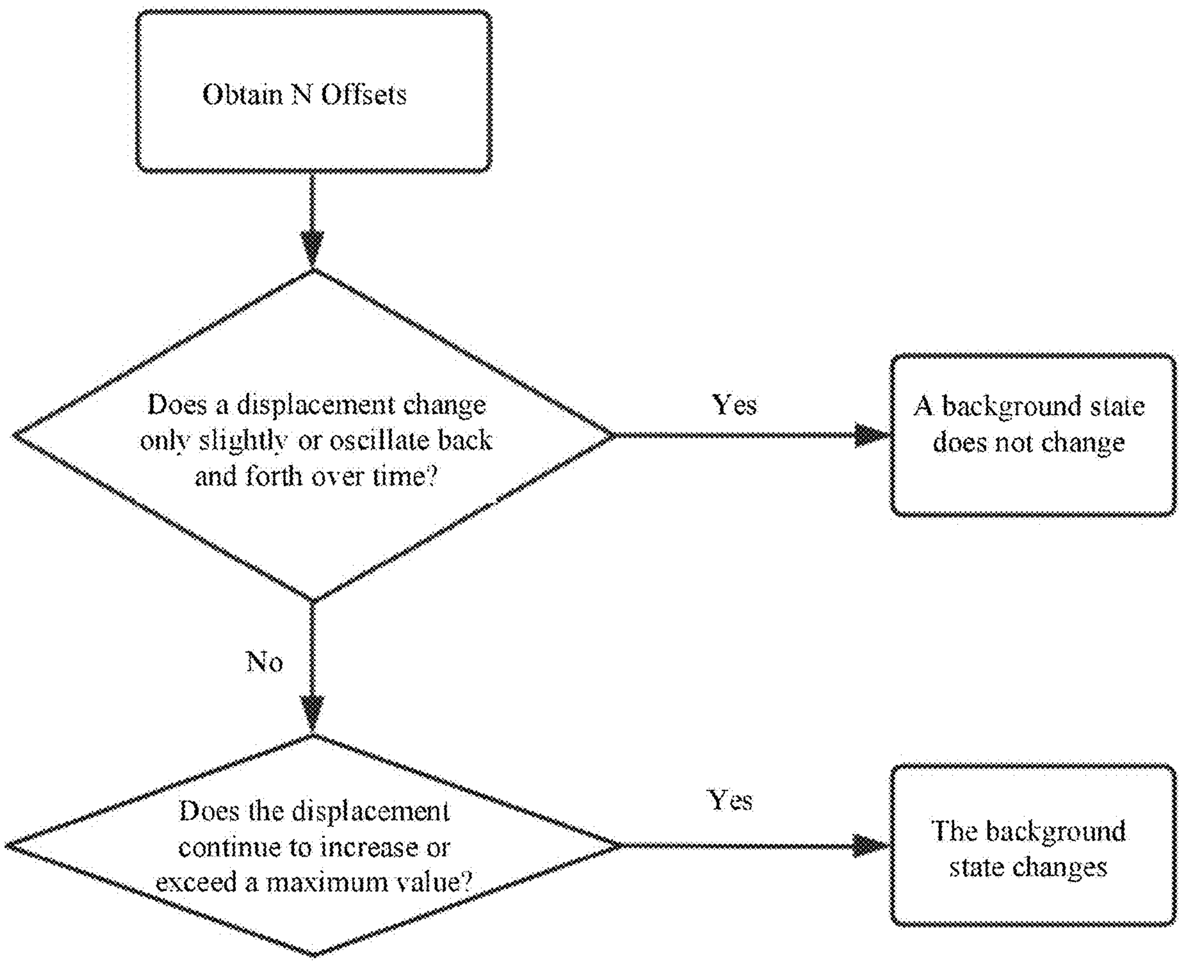
FIG. 6 is a specific flowchart of image information comparison according to the disclosure.

In this embodiment, the specific process of comparing historical image information with the current image information is shown in FIG. 6. After the current image information is acquired, a distance relative value of the images in a short term is determined. Then, it is necessary to analyze the distance to obtain the state of the current background. When a displacement value only slightly changes or oscillates back and forth with the change of time, the current state is static. When the displacement value continues to change in a certain direction, the current state is changed to an undetermined state. After the position is stable, a scene change state is triggered.

Step S24: Acquire the actual position information, verify the target object based on the actual position information by using a local device and cloud joint verification unit, determine the target object as a false positive object in response to the passed verification, generate false positive information, record and store the false positive information to a local false positive memory unit, and then perform a false positive elimination operation on the false positive object.

In this embodiment, a false positive object feature is determined based on the actual position information by using a deep neural network object self-learning algorithm, and a target object feature is determined based on the current position information by using the deep neural network object self-learning algorithm. Then, it is judged whether the false positive object feature is consistent with the target object feature, the verification is passed in response to the false positive object feature being consistent with the target object feature, and the target object is determined as the false positive object. A matching difference value is determined in response to the false positive object feature being inconsistent with the target object feature. It is judged whether the matching difference value is less than a preset threshold, a false positive object feature is redetermined in response to the matching difference value being less than the preset threshold, and then it is rejudged whether the false positive object feature is consistent with the target object feature. In a small number of household scenes, there will still be stable false positive objects in the results of the device object detection unit. Frequent invalid false positives will cause a large number of invalid alarms to be frequently given to a user, thereby seriously affecting the user experience. At this moment, the false positive memory unit is required to memorize the false positive objects to filter false positives of the same type in the results. To meet the above requirements, the false positive memory unit has two functions: (1) receiving a current scene false positive picture provided by the device and cloud joint verification unit, and memorizing the false positive object; and (2) filtering detection results of the device object detection unit, judging whether there are memorized relevant objects in the results, and removing the false positive object thereamong. For home scenes, in the case of facing the same background for a long time, this function needs to have strong generalization performance. After completing the recording of the object, it is necessary to distinguish the shape of the object under different illumination and slight angle transformation. In this way, the results outputted by the device algorithm may maintain a high accuracy rate in the absence of server and device joint verification for a long term.

Figure 7:
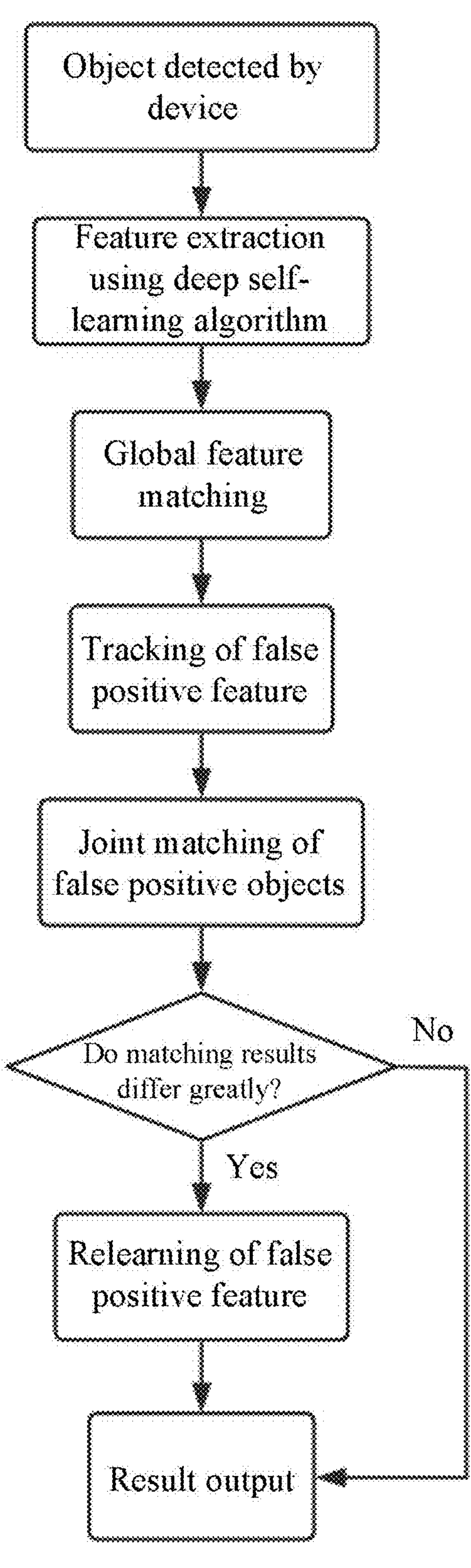
FIG. 7 is a verification flowchart of false positive object according to the disclosure.

The specific steps are shown in FIG. 7. (1) Features of the false positive object verified by the device and cloud joint verification unit are extracted through the deep neural network object self-learning algorithm, and the features of the false positive object are added to a feature library. (2) A target detected by the device is sent into the deep neural network object self-learning algorithm, a target feature is extracted, and feature matching is performed on objects memorized in the feature library to determine a matching difference value. (3) If the matching result in (2) is a false positive object, the target is tracked by using a tracking algorithm. (4) If the same object is continuously tracked in (3) and the matching difference value in (2) is lower than a preset threshold, the false positive object is relearned, and the features are re-recorded. After the false positive object is tracked by using the tracking algorithm, there is no need to use the deep self-learning algorithm frequently for repeated recognition in a short time, thereby greatly reducing the call frequency of the deep self-learning algorithm and increasing the recognition speed of the false positive memory unit.

Figure 8:
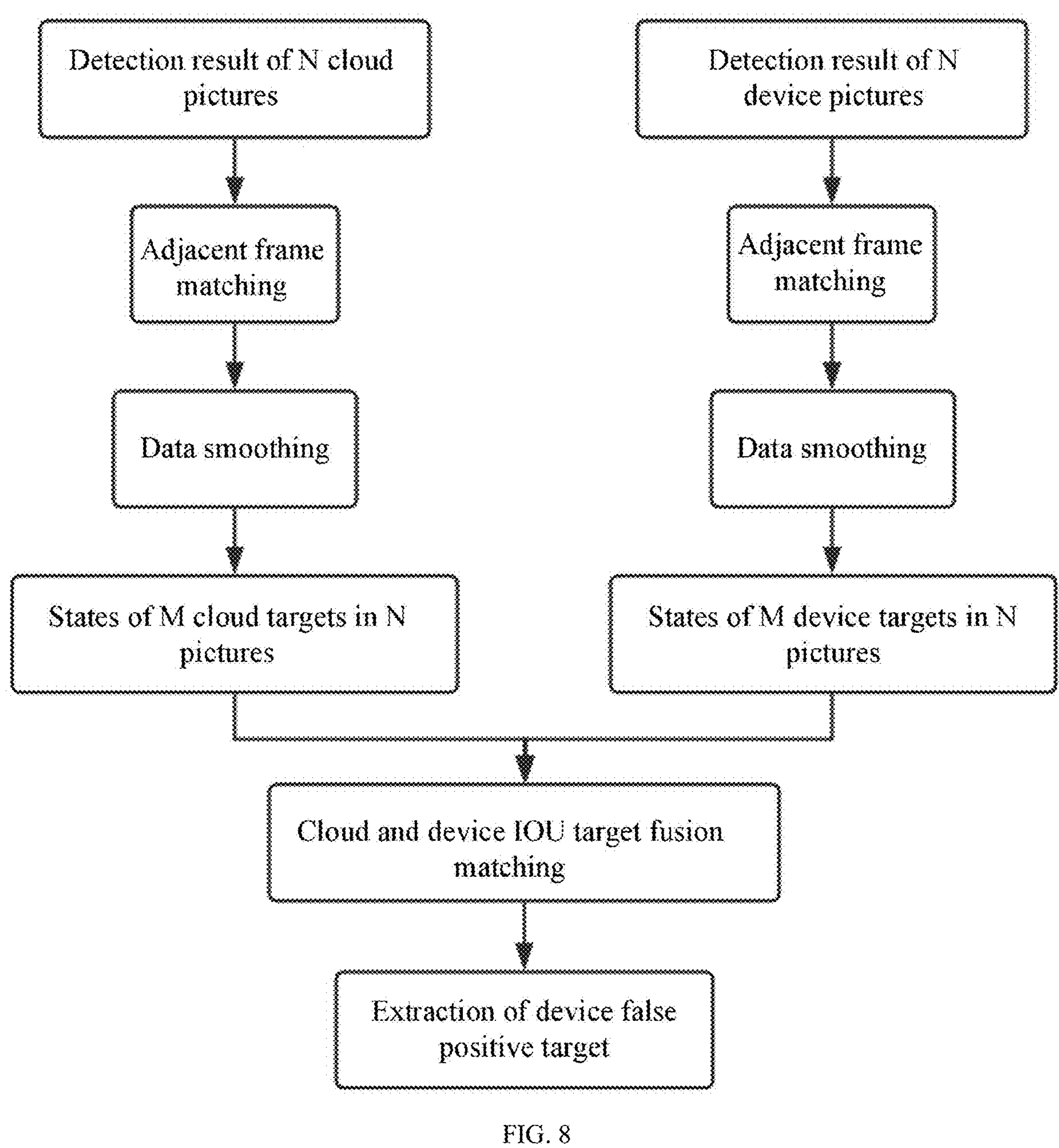
FIG. 8 is a flowchart of false positive elimination according to the disclosure.

In this embodiment, when the short-term background memory unit prompts that the current scene has changed and the device object detection unit and the false positive memory unit show that there is still a target object in the current scene, the encryption feature outputted by the device object detection unit is uploaded to the cloud at this moment. After the cloud processes the encryption feature, the result is returned to trigger the device and cloud joint verification unit. As shown in FIG. 8, the joint verification unit will receive the results returned by the cloud and device object detection units within a period of time, receive data, and perform adjacent-frame matching on multiple frames of data to acquire positions of the same object in different frames of images. After the matching is completed, due to jitter of the data with large detection results, it is necessary to smooth and filter the data to obtain a smooth motion curve. According to the IOU, the same box in the reasoning results of the cloud and the device is matched to obtain detection results of the same object on the cloud and the device. For boxes that cannot be matched, a target object that exists on the device and does not exist in the cloud are cropped out according to the cloud results, and is inputted to the false positive memory unit for memorizing the false positive object.

Figure 9:
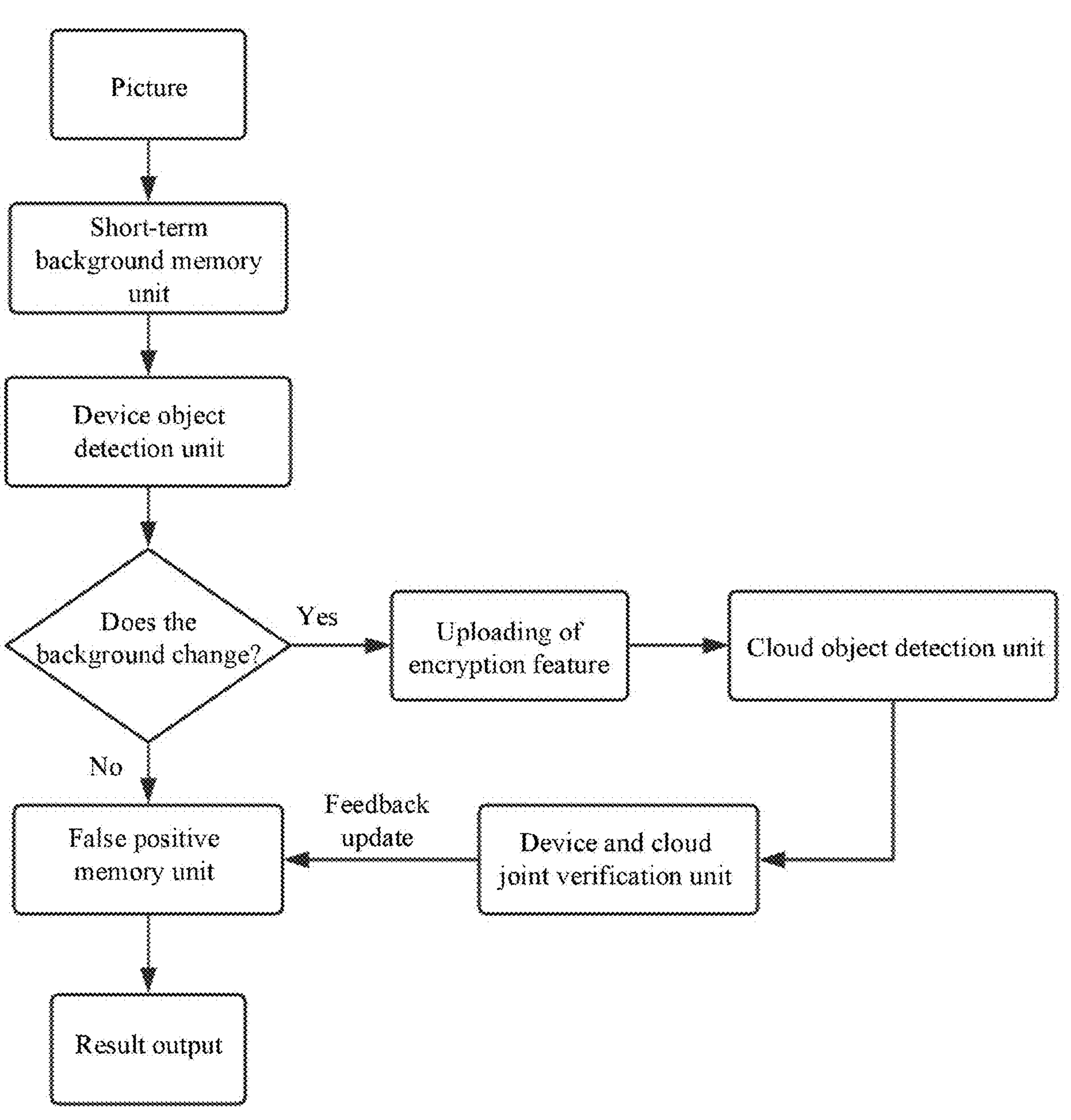
FIG. 9 is a specific flowchart of a false positive elimination method according to the disclosure.

In this embodiment, the specific process of the disclosure is shown in FIG. 9. (1) A split neural network structure SplitNetServer and a split neural network structure SplitNetEdge suitable for the device are trained, and the trained model is split and deployed to the cloud and the device respectively. (2) It is judged whether the current background changes through the local short-term background memory unit. (3) Current position information of the target object is obtained through the device object detection unit. (4) The results in (3) are filtered by the false positive memory unit. (5) If the target object is detected in (4) and the short-term background memory unit in (2) detects that the current scene has changed in a short term, an encryption feature of the split neural network model of the device is uploaded to the cloud. (6) The cloud object detection unit reasons out actual position information of the target object through the encryption feature, and then feeds back the actual position information to the device. (7) According to the feedback results from the cloud, the device verifies the results of the operation with the device through the device and cloud joint verification unit, and feeds back an erroneous object detected by the device to the false positive memory unit. (8) The false positive memory unit records the erroneous object in the current scene and tracks the erroneous object.

In this embodiment, an image of a target object is acquired, and the image is analyzed to obtain an encryption feature and current position information of the target object. Current image information of the target object is acquired, and local historical image information is compared with the current image information to obtain a comparison result. The current image information is detected according to the current position information in response to the comparison result indicating that the historical image information is inconsistent with the current image information, and the encryption feature is sent to a cloud in response to the target object being detectable in the current image information, so that the cloud determines actual position information of the target object based on the encryption feature. The actual position information is acquired, the target object is verified based on the actual position information, the target object is determined as a false positive object in response to the passed verification, and then a false positive elimination operation is performed on the false positive object. In the disclosure, an optimal network structure suitable for a cloud and a device is obtained by searching through a split network in conjunction with a deep learning network architecture, thereby reducing the computing volume of the device and the cloud. The learning ability of the network is catalyzed by using a knowledge distillation technology, thereby improving the accuracy of device and cloud algorithms. Features extracted by using the device algorithm are uploaded to the cloud for secondary computation and verification, and results are fed back to the device. The device records the relevant content of false positives and false negatives by using a false positive memory unit, thereby increasing the accuracy of the device algorithm and reducing subsequent false positives and false negatives to obtain a better intelligent experience. The disclosure has low requirements on the computing power of the device and has strong universality. A short-term background memory unit is designed, which allows joint verification between the device and the cloud when there is a major scene change, thereby effectively reducing the number of server peak requests. In addition, the cloud only deploys a split network header model, thereby improving the detection speed and improving the intelligent experience effect of the device. At the same time, only encrypted image features are uploaded, thereby effectively protecting user privacy. The running speed and accuracy can meet actual scene applications, and the promotion value is greater.

Figure 10:
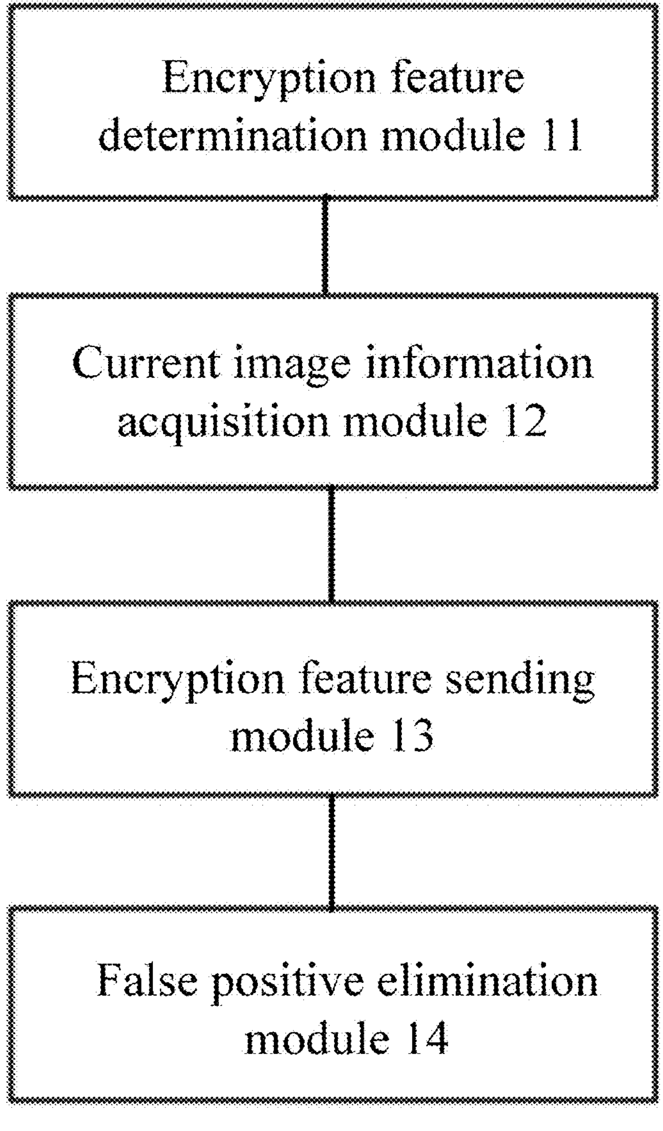
FIG. 10 is a schematic structural diagram of a false positive elimination apparatus according to the disclosure.

Referring to FIG. 10, an embodiment of the disclosure discloses a false positive elimination apparatus, which may specifically include:

- an encryption feature determination module 11, configured to acquire an image of a target object, and analyze the image to obtain an encryption feature and current position information of the target object;
- a current image information acquisition module 12, configured to acquire current image information of the target object, and compare local historical image information with the current image information to obtain a comparison result;
- an encryption feature sending module 13, configured to detect the current image information according to the current position information in response to the comparison result indicating that the historical image information is inconsistent with the current image information, and send the encryption feature to a cloud in response to the target object being detectable in the current image information, so that the cloud determines actual position information of the target object based on the encryption feature; and
- a false positive elimination module 14, configured to acquire the actual position information, verify the target object based on the actual position information, determine the target object as a false positive object in response to the passed verification, and then perform a false positive elimination operation on the false positive object.

In this embodiment, an image of a target object is acquired, and the image is analyzed to obtain an encryption feature and current position information of the target object. Current image information of the target object is acquired, and local historical image information is compared with the current image information to obtain a comparison result. The current image information is detected according to the current position information in response to the comparison result indicating that the historical image information is inconsistent with the current image information, and the encryption feature is sent to a cloud in response to the target object being detectable in the current image information, so that the cloud determines actual position information of the target object based on the encryption feature. The actual position information is acquired, the target object is verified based on the actual position information, the target object is determined as a false positive object in response to the passed verification, and then a false positive elimination operation is performed on the false positive object. In the disclosure, an optimal network structure suitable for a cloud and a device is obtained by searching through a split network in conjunction with a deep learning network architecture, thereby reducing the computing volume of the device and the cloud. The learning ability of the network is catalyzed by using a knowledge distillation technology, thereby improving the accuracy of device and cloud algorithms. Features extracted by using the device algorithm are uploaded to the cloud for secondary computation and verification, and results are fed back to the device. The device records the relevant content of false positives and false negatives by using a false positive memory unit, thereby increasing the accuracy of the device algorithm and reducing subsequent false positives and false negatives to obtain a better intelligent experience. The disclosure has low requirements on the computing power of the device and has strong universality. A short-term background memory unit is designed, which allows joint verification between the device and the cloud when there is a major scene change, thereby effectively reducing the number of server peak requests. In addition, the cloud only deploys a split network header model, thereby improving the detection speed and improving the intelligent experience effect of the device. At the same time, only encrypted image features are uploaded, thereby effectively protecting user privacy. The running speed and accuracy can meet actual scene applications, and the promotion value is greater.

In some specific embodiments, the encryption feature determination module 11 may specifically include:

- a device model acquisition module, configured to acquire a pre-trained device model; and
- a device model deployment module, configured to deploy the device model to an initial device to obtain the device.

In some specific embodiments, the current image information acquisition module 12 may specifically include:

- an image acquisition module, configured to acquire the image of the target object by using a local device object detection unit; and
- a current position information determination module, configured to send the image to the local device model to obtain the encryption feature and the current position information of the target object.

In some specific embodiments, the current image information acquisition module 12 may specifically include:

- a comparison module, configured to send current background image information to a local short-term background memory unit, so that the short-term background memory unit compares the local historical image information with the current image information by using a regression algorithm.

In some specific embodiments, the encryption feature sending module 13 may specifically include:

- a verification module, configured to verify the target object based on the actual position information by using a local device and cloud joint verification unit, determine the target object as a false positive object in response to the passed verification, and generate false positive information; and
- a false positive information sending module, configured to record and store the false positive information to a local false positive memory unit.

In some specific embodiments, the encryption feature sending module 13 may specifically include:

- a target object feature determination module, configured to determine a false positive object feature based on the actual position information by using a deep neural network object self-learning algorithm, and determine a target object feature based on the current position information by using the deep neural network object self-learning algorithm; and a judgment module, configured to judge whether the false positive object feature is consistent with the target object feature, pass the verification in response to the false positive object feature being consistent with the target object feature, and determine the target object as the false positive object.

In some specific embodiments, the encryption feature sending module 13 may specifically include:

a matching difference value determination module, configured to determine a matching difference value in response to the false positive object feature being inconsistent with the target object feature; and a matching difference value redetermination module, configured to judge whether the matching difference value is less than a preset threshold, redetermine a false positive object feature in response to the matching difference value being less than the preset threshold, and then rejudge whether the false positive object feature is consistent with the target object feature.

Figure 11:
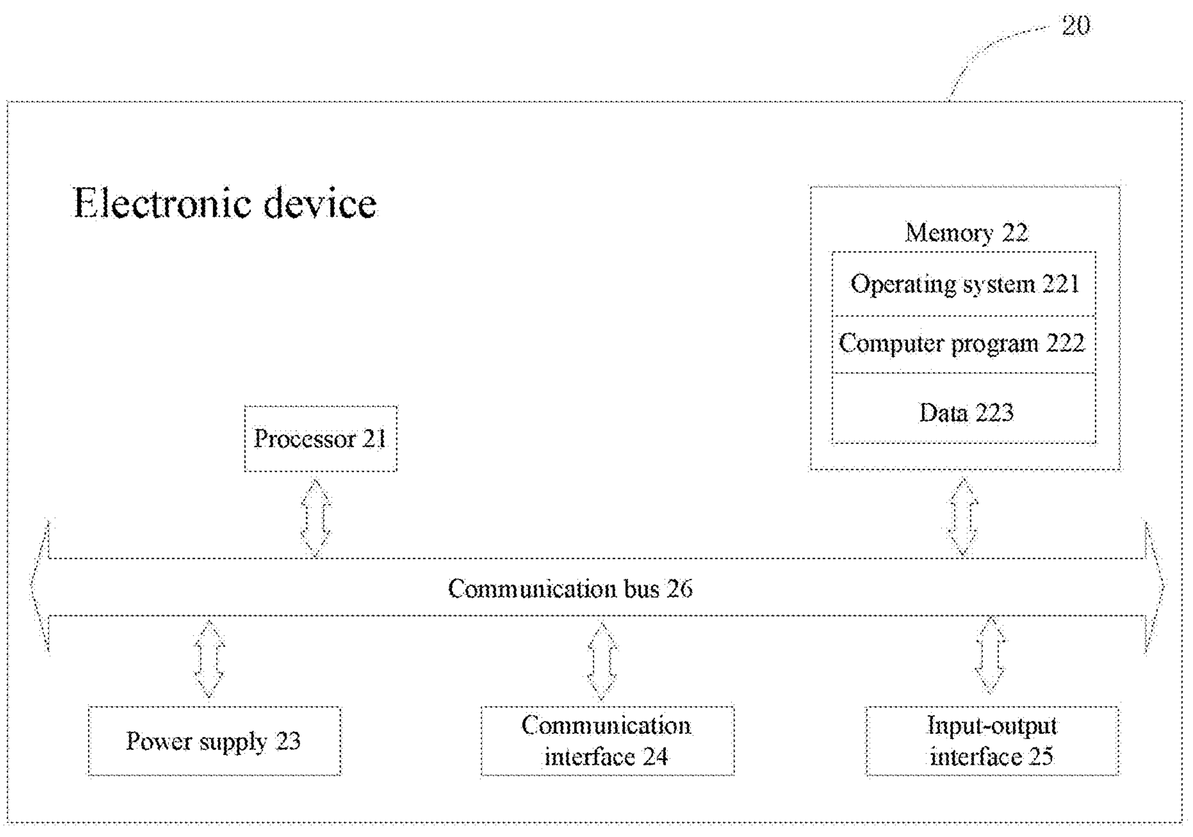
FIG. 11 is a structural diagram of an electronic device according to the disclosure.

FIG. 11 is a schematic structural diagram of an electronic device according to an embodiment of the disclosure. The electronic device 20 may specifically include: at least one processor 21, at least one memory 22, a power supply 23, a communication interface 24, an input-output interface 25, and a communication bus 26. The memory 22 is configured to store a computer program. The computer program is loaded and executed by the processor 21 to implement the relevant steps in the false positive elimination method performed by the electronic device disclosed in any of the foregoing embodiments.

In this embodiment, the power supply 23 is configured to provide operating voltages for hardware devices on the electronic device 20. The communication interface 24 can create a data transmission channel between the electronic device 20 and an external device, and a communication protocol followed thereby is any communication protocol that can be applied to the technical solution of the disclosure, and is not specifically limited herein. The input-output interface 25 is configured to acquire external input data or output data to the external world, and a specific interface type thereof may be selected according to specific application demands, and is not specifically limited herein.

In addition, the memory 22, serving as a carrier for storing resources, may be a read-only memory (ROM), a random access memory (RAM), a disk, an optical disc, or the like. Resources stored thereon include an operating system 221, a computer program 222, data 223, and the like. A storage mode may be transient storage or permanent storage.

The operating system 221 is configured to manage and control the hardware devices and the computer program 222 on the electronic device 20 to implement the operation and processing of the data 223 in the memory 22 by the processor 21, which may be Windows, Unix, Linux, and the like. The computer program 222 may further include a computer program capable of performing other specific tasks, in addition to a computer program capable of performing the false positive elimination method performed by the electronic device 20 disclosed in any of the foregoing embodiments. The data 223 may include data collected by the input-output interface 25 of the electronic device, and the like, in addition to data received by a false positive elimination device and transmitted from the external device.

The steps of the method or algorithm described in conjunction with the embodiments disclosed herein may be implemented directly with hardware, a processor-executed software module, or a combination of both. The software module may be disposed in a RAM, an internal memory, a ROM, an electrically programmable ROM, an electrically erasable programmable ROM, a register, a hard disk, a removable disk, a compact disc read-only memory (CD-ROM), or any other form of storage medium known in the art.

Further, an embodiment of the disclosure also discloses a computer-readable storage medium. The storage medium has a computer program stored therein. The computer program, when loaded and executed by a processor, implements the steps of the false positive elimination method disclosed in any of the foregoing embodiments.

Finally, it is to be additionally noted that relational terms such as first and second herein are configured solely to distinguish one entity or operation from another entity or operation without necessarily requiring or implying any such actual relationship or order between such entities or operations. Moreover, the terms "include" and "comprise" or any other variations thereof are intended to cover a non-exclusive inclusion, so that a process, method, article, or device that includes a series of elements includes not only those elements, but also other elements that are not expressly listed, or that are inherent in such a process, method, article, or device. It is not excluded, without more constraints, that additional identical elements exist in the process, method, article, or device including elements defined by a sentence "including a.".

A false positive elimination method and apparatus, a device, and a storage medium provided by the disclosure are described in detail above. While the principles and implementations of the disclosure have been described herein with reference to specific examples, the above description of the embodiments has been presented only to aid in the understanding of the method and core idea of the disclosure. At the same time, those of ordinary skill in the art will appreciate that many changes may be made in the specific implementations and application scopes in light of the idea of the disclosure. In summary, the content of this specification shall not be understood as a limitation of the disclosure.

What is claimed is:

1. A false positive elimination method, applied to a device, and comprising:

acquiring an image of a target object, and analyzing the image to obtain an encryption feature and current position information of the target object;

acquiring current image information of the target object, and comparing local historical image information with the current image information to obtain a comparison result;

detecting the current image information according to the current position information in response to the comparison result indicating that the local historical image information is inconsistent with the current image information, and sending the encryption feature to a cloud in response to the target object being detectable in the current image information, so that the cloud determines actual position information of the target object based on the encryption feature;

acquiring the actual position information, verifying the target object based on the actual position information, determining the target object as a false positive object in response to a passed verification, and then performing a false positive elimination operation on the false positive object; and wherein the step of verifying the target object based on the actual position information and determining the target object as the false positive object in response to the passed verification comprises:

verifying the target object based on the actual position information by using a local device and cloud joint verification unit, determining the target object as the false positive object in response to the passed verification, and generating false positive information; and recording and storing the false positive information to a local false positive memory unit.

2. The false positive elimination method according to claim 1, wherein before the step of acquiring the image of the target object, the false positive elimination method further comprises:

acquiring a pre-trained device model; and deploying the pre-trained device model to an initial device to obtain the device.

3. The false positive elimination method according to claim 2, wherein the step of acquiring the image of the target object and analyzing the image to obtain the encryption feature and the current position information of the target object comprises:

acquiring the image of the target object by using a local device object detection unit; and sending the image to the pre-trained device model to obtain the encryption feature and the current position information of the target object.

4. The false positive elimination method according to claim 1, wherein the step of comparing the local historical image information with the current image information comprises:

sending current background image information to a local short-term background memory unit, so that the local short-term background memory unit compares the local historical image information with the current image information by using a regression algorithm.

5. The false positive elimination method according to claim 1, wherein the step of verifying the target object based on the actual position information and determining the target object as the false positive object in response to the passed verification comprises:

determining a false positive object feature based on the actual position information by using a deep neural network object self-learning algorithm, and determining a target object feature based on the current position information by using the deep neural network object self-learning algorithm; and judging whether the false positive object feature is consistent with the target object feature, passing the verification in response to the false positive object feature being consistent with the target object feature, and determining the target object as the false positive object.

6. The false positive elimination method according to claim 5, wherein after the step of judging whether the false positive object feature is consistent with the target object feature, the false positive elimination method further comprises:

determining a matching difference value in response to the false positive object feature being inconsistent with the target object feature; and judging whether the matching difference value is less than a preset threshold, redetermining the false positive object feature in response to the matching difference value being less than the preset threshold, and then rejudging whether the false positive object feature is consistent with the target object feature.

7. An electronic device, comprising:

a memory, configured to store a computer program; and a processor, configured to execute the computer program to implement the false positive elimination method according to claim 1.

8. A non-transitory computer-readable storage medium, configured to store a computer program, wherein the computer program, when executed by a processor, implements the false positive elimination method according to claim 1.

9. The false positive elimination method according to claim 2, wherein the step of verifying the target object based on the actual position information and determining the target object as the false positive object in response to the passed verification comprises:

verifying the target object based on the actual position information by using a local device and cloud joint verification unit, determining the target object as the false positive object in response to the passed verification, and generating false positive information; and recording and storing the false positive information to a local false positive memory unit.

10. The false positive elimination method according to claim 3, wherein the step of verifying the target object based on the actual position information and determining the target object as the false positive object in response to the passed verification comprises:

verifying the target object based on the actual position information by using a local device and cloud joint verification unit, determining the target object as the false positive object in response to the passed verification, and generating false positive information; and recording and storing the false positive information to a local false positive memory unit.

11. The false positive elimination method according to claim 4, wherein the step of verifying the target object based on the actual position information and determining the target object as the false positive object in response to the passed verification comprises:

verifying the target object based on the actual position information by using a local device and cloud joint verification unit, determining the target object as the false positive object in response to the passed verification, and generating false positive information; and recording and storing the false positive information to a local false positive memory unit.

12. The electronic device according to claim 7, wherein before the step of acquiring the image of the target object, the false positive elimination method further comprises:

acquiring a pre-trained device model; and deploying the pre-trained device model to an initial device to obtain the device.

13. The electronic device according to claim 12, wherein the step of acquiring the image of the target object and analyzing the image to obtain the encryption feature and the current position information of the target object comprises:

acquiring the image of the target object by using a local device object detection unit; and sending the image to the pre-trained device model to obtain the encryption feature and the current position information of the target object.

14. The electronic device according to claim 7, wherein the step of comparing the local historical image information with the current image information comprises:

sending current background image information to a local short-term background memory unit, so that the local short-term background memory unit compares the local historical image information with the current image information by using a regression algorithm.

15. The electronic device according to claim 7, wherein the step of verifying the target object based on the actual position information and determining the target object as the false positive object in response to the passed verification comprises:

verifying the target object based on the actual position information by using a local device and cloud joint verification unit, determining the target object as the false positive object in response to the passed verification, and generating false positive information; and recording and storing the false positive information to a local false positive memory unit.

16. The electronic device according to claim 15, wherein the step of verifying the target object based on the actual position information and determining the target object as the false positive object in response to the passed verification comprises:

determining a false positive object feature based on the actual position information by using a deep neural network object self-learning algorithm, and determining a target object feature based on the current position information by using the deep neural network object self-learning algorithm; and judging whether the false positive object feature is consistent with the target object feature, passing the verification in response to the false positive object feature being consistent with the target object feature, and determining the target object as the false positive object.

17. The electronic device according to claim 16, wherein after the step of judging whether the false positive object feature is consistent with the target object feature, the false positive elimination method further comprises:

determining a matching difference value in response to the false positive object feature being inconsistent with the target object feature; and judging whether the matching difference value is less than a preset threshold, redetermining the false positive object feature in response to the matching difference value being less than the preset threshold, and then rejudging whether the false positive object feature is consistent with the target object feature.

18. The computer-readable storage medium according to claim 8, wherein before the step of acquiring the image of the target object, the false positive elimination method further comprises:

acquiring a pre-trained device model; and deploying the pre-trained device model to an initial device to obtain the device.

* * * * *